(12) United States Patent
Muta et al.

(10) Patent No.: US 7,575,078 B2
(45) Date of Patent: Aug. 18, 2009

(54) VEHICLE AND CONTROL METHOD OF VEHICLE

(75) Inventors: Koichiro Muta, Okazaki (JP); Mitsuaki Higa, Toyota (JP); Yuichiro Kitamura, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 162 days.

(21) Appl. No.: 11/907,094

(22) Filed: Oct. 9, 2007

(65) Prior Publication Data

US 2008/0093141 A1    Apr. 24, 2008

(51) Int. Cl.
*B60W 10/00* (2006.01)
*B60W 20/00* (2006.01)

(52) U.S. Cl. .............. 180/65.265; 180/65.21; 903/945

(58) Field of Classification Search ............ 180/65.265, 180/65.285, 65.21, 65.225, 65.26, 65.27, 180/65.275, 65.28, 65.31; 903/945, 918, 903/946; 477/3, 5
See application file for complete search history.

(56) References Cited

U.S. PATENT DOCUMENTS

| | | | | |
|---|---|---|---|---|
| 5,722,502 A | * | 3/1998 | Kubo ............... | 180/65.23 |
| 5,993,351 A | * | 11/1999 | Deguchi et al. ....... | 477/5 |
| 6,083,138 A | * | 7/2000 | Aoyama et al. ....... | 477/5 |
| 6,159,160 A | * | 12/2000 | Hsei et al. ............ | 600/560 |
| 6,274,437 B1 | * | 8/2001 | Evans ................ | 438/272 |
| 6,581,705 B2 | * | 6/2003 | Phillips et al. ....... | 180/65.25 |
| 6,976,934 B2 | * | 12/2005 | Komeda et al. ....... | 180/65.285 |
| 7,108,088 B2 | * | 9/2006 | Muta ................. | 180/65.235 |
| 7,125,362 B2 | * | 10/2006 | Beaty et al. .......... | 477/3 |
| 7,213,665 B2 | * | 5/2007 | Yamaguchi et al. ..... | 180/65.27 |
| 7,431,111 B2 | * | 10/2008 | Nada ................. | 180/65.28 |
| 7,443,116 B2 | * | 10/2008 | Kutsuna et al. ....... | 180/65.31 |
| 7,478,691 B2 | * | 1/2009 | Yamaguchi et al. ..... | 180/65.28 |

FOREIGN PATENT DOCUMENTS

| JP | A 2003-130203 | 5/2003 |
|---|---|---|
| JP | A 2005-337491 | 12/2005 |

* cited by examiner

*Primary Examiner*—Hau V Phan
(74) *Attorney, Agent, or Firm*—Oliff & Berridge, PLC

(57) ABSTRACT

The control procedure of the invention sets a target rotation speed Ne* and a target torque Te* of an engine corresponding to a torque demand Td* required for driving the vehicle (steps S100 to S120). In response to an upshift request for a gear of a transmission, the control procedure sets a positive pre-upshift target rotation speed Nmtag to a target rotation speed Nm1* of a first motor (step S230). The control procedure changes the target rotation speed Ne* of the engine to a specific rotation speed corresponding to the pre-upshift target rotation speed Nmtag of the first motor (step S240) and subsequently implements an actual change of the gear in the transmission (step S310). This arrangement effectively restrains a battery from being overcharged with excess electric power.

6 Claims, 8 Drawing Sheets

VEHICLE AND CONTROL METHOD OF VEHICLE

BACKGROUND

1. Technical Field

The present invention relates to a vehicle and a control method of the vehicle.

2. Related Art

One proposed structure of a vehicle is equipped with an engine, a planetary gear having a carrier connected to an output shaft of the engine, a first motor connected to a sun gear of the planetary gear, a second motor having a rotor connected to a ring gear of the planetary gear, a transmission linked to the rotor of the second motor and to a driveshaft connected with an axle of the vehicle, and a battery transmitting electric power to and from the first motor and the second motor (see, for example, Japanese Patent Laid-Open Gazette No. 2005-337491). The vehicle of this prior art structure changes the gear of the transmission while keeping the operation of the engine at an efficient drive point, thus improving the fuel consumption.

SUMMARY

In the vehicle of the above prior art structure, however, in the case of an upshift of the gear of the transmission with the operation of the engine kept at the efficient drive point, both the first motor and the second motor may function to generate electric power and cause overcharge of the battery with excess electric power. Such overcharge of the battery with the excess electric power undesirably accelerates the deterioration of the battery and is thus to be avoided.

In a vehicle equipped with: a rotation regulator that is linked to an output shaft of an internal combustion engine, is connected to a power shaft different from the output shaft to enable rotation of the power shaft independently of the output shaft, and regulates a rotation speed of the output shaft relative to the power shaft through input and output of electric powers and input and output of driving forces to and from the output shaft and the power shaft; a motor that inputs and outputs power to and from the power shaft; a transmission that is linked to the power shaft and to a driveshaft connected with an axle and a control method of such a vehicle, there is a need of preventing an accumulator, which transmits electric power to and from the rotation regulator and the motor, from being overcharged with excess electric power in the course of an upshift of the gear of the transmission.

At least part of the above and the other related demands is attained by a vehicle of the invention and a control method of the vehicle having the configurations discussed below.

According to one aspect, the present invention is directed to a vehicle including: an internal combustion engine; a rotation regulator that is linked to an output shaft of the internal combustion engine, is connected to a power shaft different from the output shaft to enable rotation of the power shaft independently of the output shaft, and regulates a rotation speed of the output shaft relative to the power shaft through input and output of electric powers and input and output of driving forces to and from the output shaft and the power shaft; a motor that inputs and outputs power to and from the power shaft; a change speed transmission that is linked to the power shaft and to a driveshaft connected with an axle and enables transmission of power between the power shaft and the driveshaft with a change of a gear; an accumulator that transmits electric power to and from the rotation regulator and the motor; a target drive point setting module that sets a target drive point of the internal combustion engine corresponding to a driving force demand required for driving the vehicle; a target speed setting module that sets a target speed as the gear of the change speed transmission corresponding to the driving force demand and a vehicle speed; and a control module that, in the case of no upshift of the gear of the change speed transmission, controls the internal combustion engine, the rotation regulator, the motor, and the change speed transmission to keep operation of the internal combustion engine at the set target drive point and to drive the vehicle with output of a driving force equivalent to the driving force demand at the target speed set to the gear of the change speed transmission. In the case of an upshift of the gear of the change speed transmission, the control module controls the internal combustion engine, the rotation regulator, the motor, and the change speed transmission to change a drive point of the internal combustion engine until the rotation regulator falls into a specific operation state to output charging electric power of not higher than a predetermined electric power level in the course of changing the gear of the change speed transmission to the set target speed while keeping a current setting of the gear of the change speed transmission and the drive of the vehicle with the output of the driving force equivalent to the driving force demand. After the change of the drive point of the internal combustion engine, the control module controls the internal combustion engine, the rotation regulator, the motor, and the change speed transmission to actually change the gear of the change speed transmission to the set target speed while keeping the operation of the internal combustion engine at the changed drive point.

In the case of an upshift of the gear of the change speed transmission, the vehicle of the invention controls the internal combustion engine, the rotation regulator, the motor, and the change speed transmission to change the drive point of the internal combustion engine until the rotation regulator falls into the specific operation state to output the charging electric power of not higher than the predetermined electric power level in the course of changing the gear of the change speed transmission to the set target speed while keeping the current setting of the gear of the change speed transmission and the drive of the vehicle with the output of the driving force equivalent to the driving force demand. After the change of the drive point of the internal combustion engine, the vehicle of the invention controls the internal combustion engine, the rotation regulator, the motor, and the change speed transmission to actually change the gear of the change speed transmission to the target speed, which is set corresponding to the driving force demand and the vehicle speed, while keeping the operation of the internal combustion engine at the changed drive point. The control procedure of the invention implements the actual change of the gear of the change speed transmission to the target speed only after the change of the drive point of the internal combustion engine to make the rotation regulator in the specific operation state of outputting the charging electric power of or below the predetermined electric power level in the course of changing the gear of the change speed transmission to the set target speed. This arrangement effectively prevents the accumulator from being overcharged with excess electric power in the course of the change of the gear of the change speed transmission to the target speed. The terminology of 'in the case of no upshift of the gear of the change speed transmission' in the specification hereof includes 'in the case of a downshift of the gear of the change speed transmission' and 'in the case of no gear change of the change speed transmission'.

In one application of the vehicle of the invention, the control module changes the drive point of the internal combustion engine to increase a rotation speed of the internal combustion engine, in the case of the upshift of the gear of the change speed transmission.

In another application of the vehicle of the invention, the control module changes the drive point of the internal combustion engine to keep an output power level of the internal combustion engine, in the case of the upshift of the gear of the change speed transmission. This arrangement ensures the change of the gear of the change speed transmission to the set target speed with output of power equivalent to the driving force demand required for driving the vehicle from the internal combustion engine.

In one preferable embodiment of the vehicle of the invention, in the case of the upshift of the gear of the change speed transmission, when charging electric power for charging the accumulator does not exceed an input limit of the accumulator as a maximum chargeable electric power in the course of changing the gear of the change speed transmission to the set target speed with the operation of the internal combustion engine kept at the set target drive point, the control module controls the internal combustion engine, the rotation regulator, the motor, and the change speed transmission to actually change the gear of the change speed transmission to the set target speed without changing the drive point of the internal combustion engine but with keeping the operation of the internal combustion engine at the set target drive point. When the charging electric power for charging the accumulator does not exceed the input limit of the accumulator as the maximum chargeable electric power, in the case of the upshift of the gear of the change speed transmission, the vehicle of this embodiment enables the actual change of the gear of the change speed transmission to the set target speed with keeping the operation of the internal combustion engine at the target drive point.

In another preferable embodiment of the vehicle of the invention, the target drive point setting module sets the target drive point of the internal combustion engine, based on the driving force demand and an efficient operation restriction for ensuring efficient operation of the internal combustion engine. This arrangement desirably improves the fuel consumption of the vehicle.

In one preferable structure of the vehicle of the invention, the rotation regulator has: a three shaft-type power input output mechanism that is connected to three shafts, the output shaft of the internal combustion engine, the power shaft, and a third shaft and determines input and output of power to and from a remaining shaft based on input and output of powers to and from any two shafts among the three shafts; and a generator that inputs and outputs power to and from the third shaft.

According to another aspect, the present invention is directed to a control method of a vehicle. The vehicle is equipped with: an internal combustion engine; a rotation regulator that is linked to an output shaft of the internal combustion engine, is connected to a power shaft different from the output shaft to enable rotation of the power shaft independently of the output shaft, and regulates a rotation speed of the output shaft relative to the power shaft through input and output of electric powers and input and output of driving forces to and from the output shaft and the power shaft; a motor that inputs and outputs power to and from the power shaft; a change speed transmission that is linked to the power shaft and to a driveshaft connected with an axle and enables transmission of power between the power shaft and the driveshaft with a change of a gear; and an accumulator that transmits electric power to and from the rotation regulator and the motor. In the case of no upshift of the gear of the change speed transmission, the control method controls the internal combustion engine, the rotation regulator, the motor, and the change speed transmission to keep operation of the internal combustion engine at a target drive point, which is set corresponding to a driving force demand required for driving the vehicle, and to drive the vehicle with output of a driving force equivalent to the driving force demand at a target speed, which is set as the gear of the change speed transmission corresponding to the driving force demand and a vehicle speed. In the case of an upshift of the gear of the change speed transmission, the control method controls the internal combustion engine, the rotation regulator, the motor, and the change speed transmission to change a drive point of the internal combustion engine until the rotation regulator falls into a specific operation state to output charging electric power of not higher than a predetermined electric power level in the course of changing the gear of the change speed transmission to the set target speed while keeping a current setting of the gear of the change speed transmission and the drive of the vehicle with the output of the driving force equivalent to the driving force demand. After the change of the drive point of the internal combustion engine, the control method controls the internal combustion engine, the rotation regulator, the motor, and the change speed transmission to actually change the gear of the change speed transmission to the set target speed while keeping the operation of the internal combustion engine at the changed drive point.

In one preferable embodiment of the control method of the invention, in the case of an upshift of the gear of the change speed transmission, the vehicle of the invention controls the internal combustion engine, the rotation regulator, the motor, and the change speed transmission to change the drive point of the internal combustion engine until the rotation regulator falls into the specific operation state to output the charging electric power of not higher than the predetermined electric power level in the course of changing the gear of the change speed transmission to the set target speed while keeping the current setting of the gear of the change speed transmission and the drive of the vehicle with the output of the driving force equivalent to the driving force demand. After the change of the drive point of the internal combustion engine, the vehicle of the invention controls the internal combustion engine, the rotation regulator, the motor, and the change speed transmission to actually change the gear of the change speed transmission to the target speed, which is set corresponding to the driving force demand and the vehicle speed, while keeping the operation of the internal combustion engine at the changed drive point. The control procedure of the invention implements the actual change of the gear of the change speed transmission to the target speed only after the change of the drive point of the internal combustion engine to make the rotation regulator in the specific operation state of outputting the charging electric power of or below the predetermined electric power level in the course of changing the gear of the change speed transmission to the set target speed. This arrangement effectively prevents the accumulator from being overcharged with excess electric power in the course of the change of the gear of the change speed transmission to the target speed. The terminology of 'in the case of no upshift of the gear of the change speed transmission' in the specification hereof includes 'in the case of a downshift of the gear of the change speed transmission' and 'in the case of no gear change of the change speed transmission'.

DESCRIPTION OF THE PREFERRED EMBODIMENTS

Figure 1:
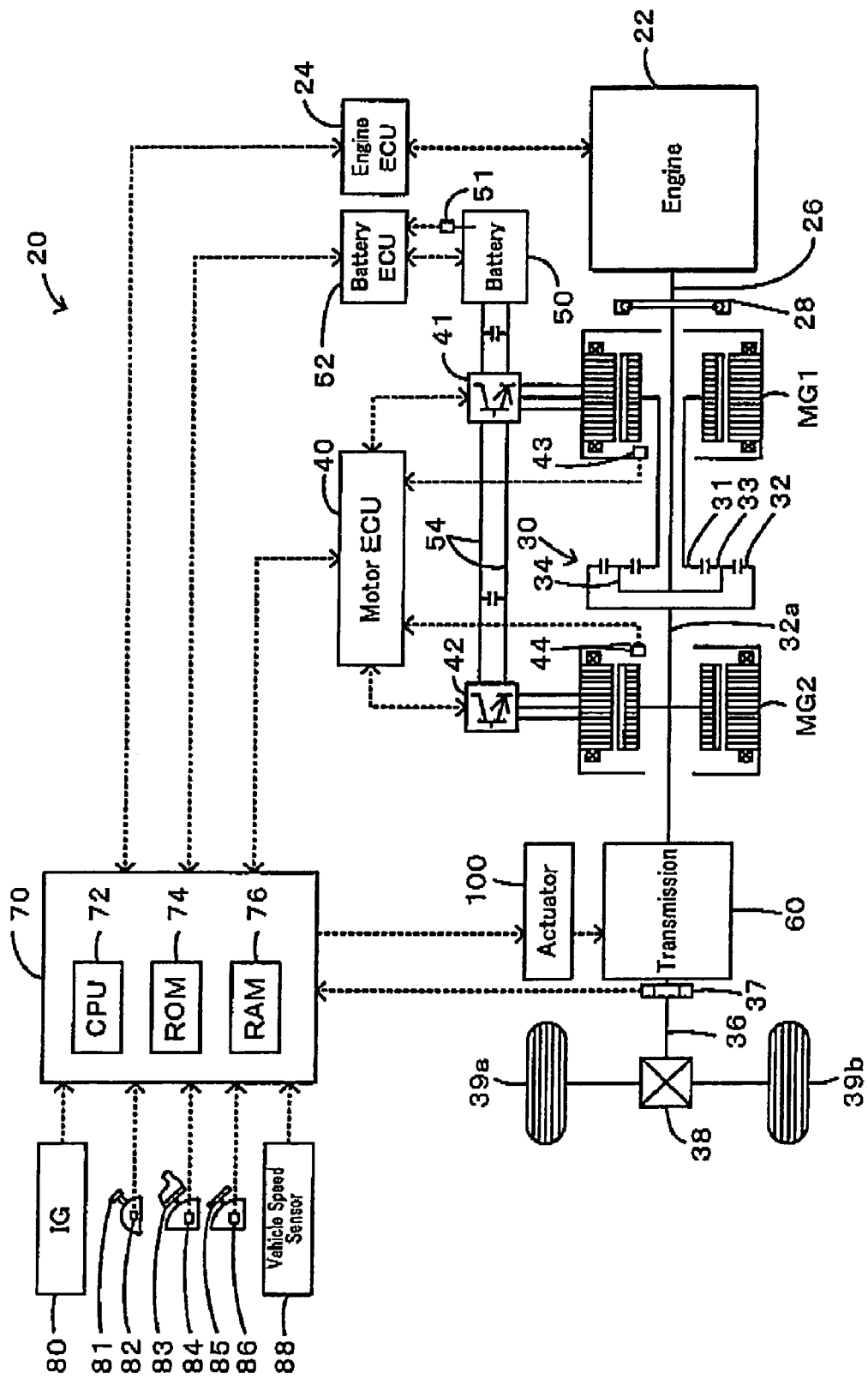
FIG. 1 schematically illustrates the configuration of a hybrid vehicle in one embodiment of the invention.

One mode of carrying out the invention is described below as a preferred embodiment with reference to the accompanied drawings. FIG. 1 schematically illustrates the configuration of a hybrid vehicle 20 in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is linked to the power distribution integration mechanism 30 and has power generation capability, a motor MG2 that is linked to a ring gear shaft 32a or a power shaft connected to the power distribution integration mechanism 30, a transmission 60 that converts power of the ring gear shaft 32a and outputs the converted power to a driveshaft 36 connected to drive wheels 39a and 39b, and a hybrid electronic control unit 70 that controls the operations of the whole hybrid vehicle 20.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the ring gear shaft 32a as a rotating shaft. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via the transmission 60, the driveshaft 36, and the differential gear 38 from the ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, the rotational positions of rotors in the motors MG1 and MG2 from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

Figure 2:
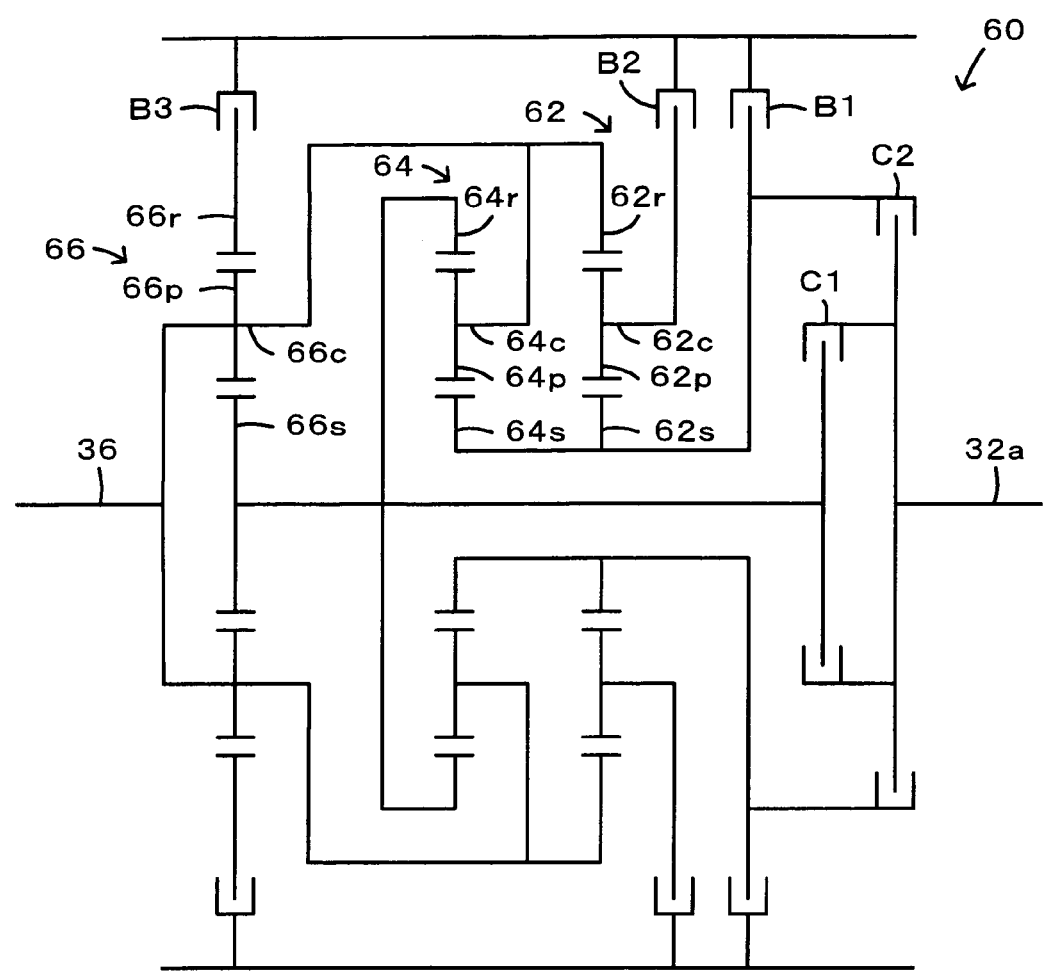
FIG. 2 schematically shows the structure of a transmission mounted on the hybrid vehicle.

The transmission 60 is constructed to connect the ring gear shaft 32a as the power shaft with the driveshaft 36 for transmission of power between the ring gear shaft 32a and the driveshaft 36 with a change of the speed and to disconnect the ring gear shaft 32a from the driveshaft 36. One example of the structure of the transmission 60 is shown in FIG. 2. The transmission 60 of FIG. 2 has single-pinion planetary gear mechanisms 62, 64, and 66, two clutches C1 and C2, and three brakes B1, B2, and B3. The planetary gear mechanism 62 includes a sun gear 62s as an external gear, a ring gear 62r as an internal gear arranged concentrically with the sun gear 62s, multiple pinion gears 62p engaging with the sun gear 62s and with the ring gear 62r, and a carrier 62c holding the multiple pinion gears 62p to allow both their revolutions and their rotations on their axes. The sun gear 62s is connected to and is disconnected from the ring gear shaft 32a by engagement and release of the clutch C2. Engagement and release of the brake B1 stop and allow the rotation of the sun gear 62s, while engagement and release of the brake B2 stop and allow the rotation of the carrier 62c. The planetary gear mechanism 64 includes a sun gear 64s as an external gear, a ring gear 64r as an internal gear arranged concentrically with the sun gear 64s, multiple pinion gears 64p engaging with the sun gear 64s and with the ring gear 64r, and a carrier 64c holding the multiple pinion gears 64p to allow both their revolutions and their rotations on their axes. The sun gear 64s is linked to the sun gear 62s of the planetary gear mechanism 62. The ring gear 64r is connected to and is disconnected from the ring gear shaft 32a by engagement and release of the clutch C1. The carrier 64c is linked to the ring gear 62r of the planetary gear mechanism 62. The planetary gear mechanism 66 includes a sun gear 66s as an external gear, a ring gear 66r as an internal gear arranged concentrically with the sun gear 66s, multiple pinion gears 66p engaging with the sun gear 66s and with the ring gear 66r, and a carrier 66c holding the multiple pinion gears 66p to allow both their revolutions and their rotations on their axes. The sun gear 66s is linked to the ring gear 64r of the planetary gear mechanism 64. Engagement and release of the brake B3 stop and allow the rotation of the ring gear 66r. The carrier 66c is linked to the ring gear 62r of the planetary gear mechanism 62, to the carrier 64c of the planetary gear mechanism 64, and to the driveshaft 36. In the transmission 60, the release of all the clutches C1 and C2 and the brakes B1, B2, and B3 disconnects the ring gear shaft 32a from the drive shaft 36. The engagement of the clutch C1 and the brake B3 in combination with the release of the clutch C2 and the brakes B1 and B2 reduces the rotation of the ring gear shaft 32a at a relatively high reduction ratio and transmits the reduced rotation to the driveshaft 36. Hereafter this state is referred to as the 'first speed'. The engagement of the clutch C1 and the brake B2 in combination with the release of the clutch C2 and the brakes B1 and B3 reduces the rotation of the ring gear shaft 32a at a lower reduction ratio than that in the first speed and transmits the reduced rotation to the drive shaft 36. Hereafter this state is referred to as the 'second speed'. The engagement of the clutch C1 and the brake B1 in combination with the release of the clutch C2 and the brakes B2 and B3 reduces the rotation of the ring gear shaft 32a at a lower reduction ratio than that in the second speed and transmits the reduced rotation to the driveshaft 36. Hereafter this state is referred to as the 'third speed'. The engagement of the clutches C1 and C2 in combination with the release of the brakes B1, B2, and B3 directly transmits the rotation of the ring gear shaft 32a to the driveshaft 36 without speed reduction. Hereafter this state is referred to as the 'fourth speed'. In the transmission 60, the engagement of the clutch C2 and the brake B3 in combination with the release of the clutch C1 and the brakes B1 and B2 reverses and reduces the rotation of the ring gear shaft 32a and transmits the reversed and reduced rotation to the driveshaft 36. Hereafter this state is referred to as the 'reverse speed'. In the structure of this embodiment, a hydraulic actuator 100 is driven to regulate the hydraulic pressures applied to the clutches C1, C2 and C3 and the brakes B1, B2 and thereby control the engagement and the release of the clutches C1, C2 and C3 and the brakes B1, B2. The actuator 100 is driven and controlled by the hybrid electronic control unit 70.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, a rotation speed No of the driveshaft 36 from a rotation speed sensor 37, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 establishes communication with the engine ECU 24, the motor ECU 40, and the battery ECU 52 via its communication port to receive and send diversity of control signals and data from and to the engine ECU 24, the motor ECU 40, and the battery ECU 52, as mentioned above.

The hybrid vehicle 20 of the embodiment thus constructed calculates a torque demand to be output to the drive shaft 36, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
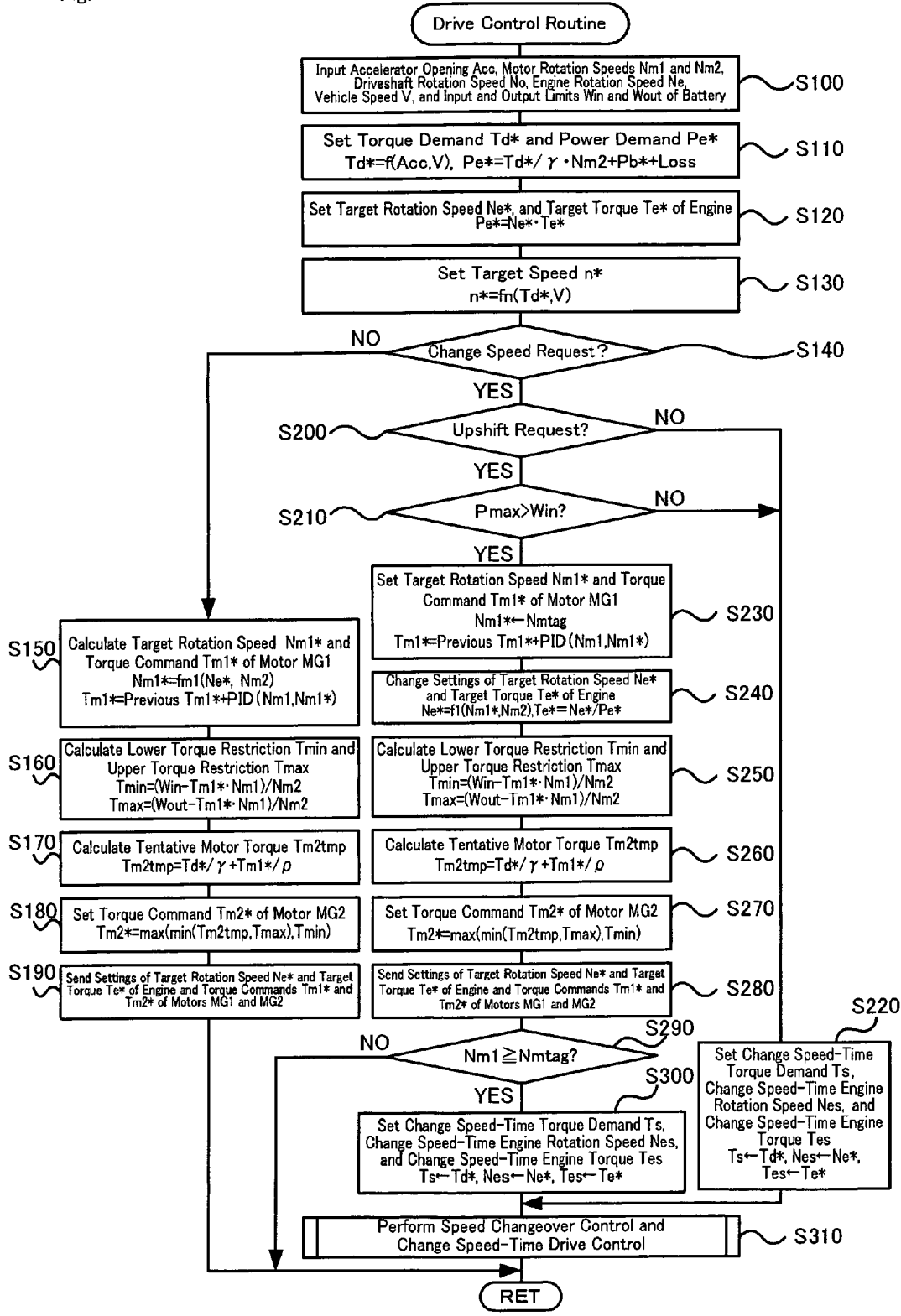
FIG. 3 is a flowchart showing a drive control routine executed by a hybrid electronic control unit included in the hybrid vehicle of the embodiment.

The description regards the operations of the hybrid vehicle 20 of the embodiment having the configuration discussed above, especially a series of operation control at the time of an upshift of speed in the transmission 60. FIG. 3 is a flowchart showing a drive control routine executed by the hybrid electronic control unit 70 in the embodiment. The drive control routine of FIG. 3 is performed repeatedly at preset time intervals, for example, at every several msec, except the processing time of step S310.

In the drive control routine of FIG. 3, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, a rotation speed Ne of the engine 22, an input limit Win and an output limit Wout of the battery 50, and the rotation speed No of the driveshaft 36 from the rotation speed sensor 37 (step S100). The rotation speed Ne of the engine 22 is computed from a signal representing a crank position detected by a crank position sensor (not shown) attached to the crankshaft 26 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The input limit Win and the output limit Wout of the battery 50 are set based on the battery temperature Tb of the battery 50 measured by the temperature sensor 51 and the state of charge SOC of the battery 50 and is received from the battery ECU 52 by communication.

Figure 4:
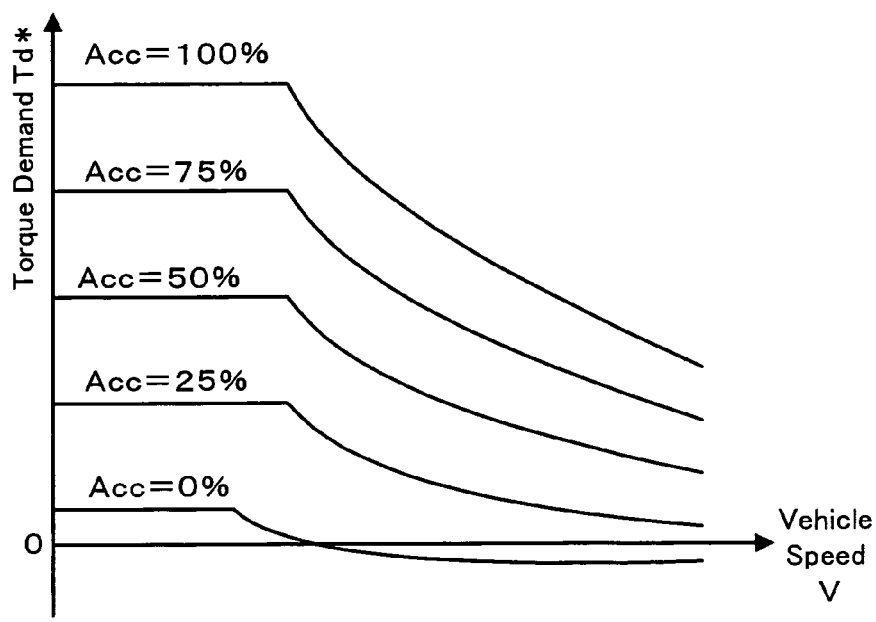
FIG. 4 shows one example of a torque demand setting map.

After the data input, the CPU 72 sets a torque demand Td* to be output to the driveshaft 36 as a torque required for the hybrid vehicle 20 and a power demand Pe* to be output from the engine 22, based on the input accelerator opening Acc and the input vehicle speed V (step S110). A concrete procedure of setting the torque demand Td* in this embodiment stores in advance variations in torque demand Td* against the accelerator opening Acc and the vehicle speed V as a torque demand setting map in the ROM 74 and reads the torque demand Td* corresponding to the given accelerator opening Acc and the given vehicle speed V from this torque demand setting map. One example of the torque demand setting map is shown in FIG. 4. The power demand Pe* is calculated as the sum of the product of a torque to be output to the ring gear shaft 32a, which is equivalent to division of the torque demand Td* by a change gear ratio γ, and a rotation speed Nr of the ring gear shaft 32a (=a rotation speed Nm2 of the motor MG2), the battery electric power demand Pb* to be charged into or discharged from the battery 50, and a potential loss.

Figure 5:
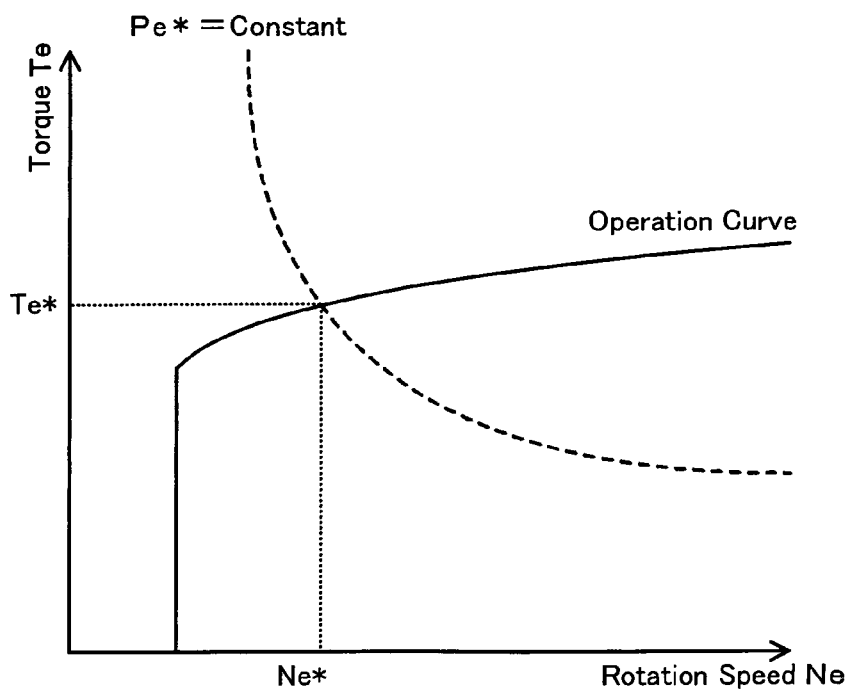
FIG. 5 shows an operation curve of an engine to set a target rotation speed Ne* and a target torque Te*.

A target rotation speed Ne* and a target torque Te* of the engine 22 are set corresponding to the power demand Pe* (step S120). The target rotation speed Ne* and the target torque Te* of the engine 22 are determined according to an operation curve of ensuring efficient operations of the engine 22 and a curve of the power demand Pe*. FIG. 5 shows one example of the operation curve of the engine 22 to set the target rotation speed Ne* and the target torque Te*. As clearly shown in FIG. 5, the target rotation speed Ne* and the target torque Te* are given as an intersection of the operation curve and a curve of constant power demand Pe* (=Ne*×Te*).

A target speed n* of the transmission 60 is subsequently set based on the torque demand Td* and the vehicle speed V (step S130). A concrete procedure of setting the target speed n* in this embodiment stores in advance variations in speed against the vehicle speed V and the torque demand Td* as a change speed chart in the ROM 74 and sets the target speed n* to a speed read from the change speed chart corresponding to the given vehicle speed V and the given torque demand Td*.

The CPU 72 then specifies the presence or the absence of a change speed request of the transmission 60 (step S140). The process of specification compares the target speed n* and a current speed 'n' and identifies the presence of a change speed request when the current speed 'n' is different from the target speed n*. When there is no change speed request (step S140: no), the CPU 72 calculates a target rotation speed Nm1* of the motor MG1 from the target rotation speed Ne* of the engine 22, the rotation speed Nr (=Nm2) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S150):

$$Nm1^* = Ne^* \cdot (1+\rho)/\rho - Nm2/\rho \tag{1}$$

$$Tm1^* = \text{Previous}Tm1^* + k1(Nm1^* - Nm1) + k2\int(Nm1^* - Nm1)dt \tag{2}$$

Figure 6:
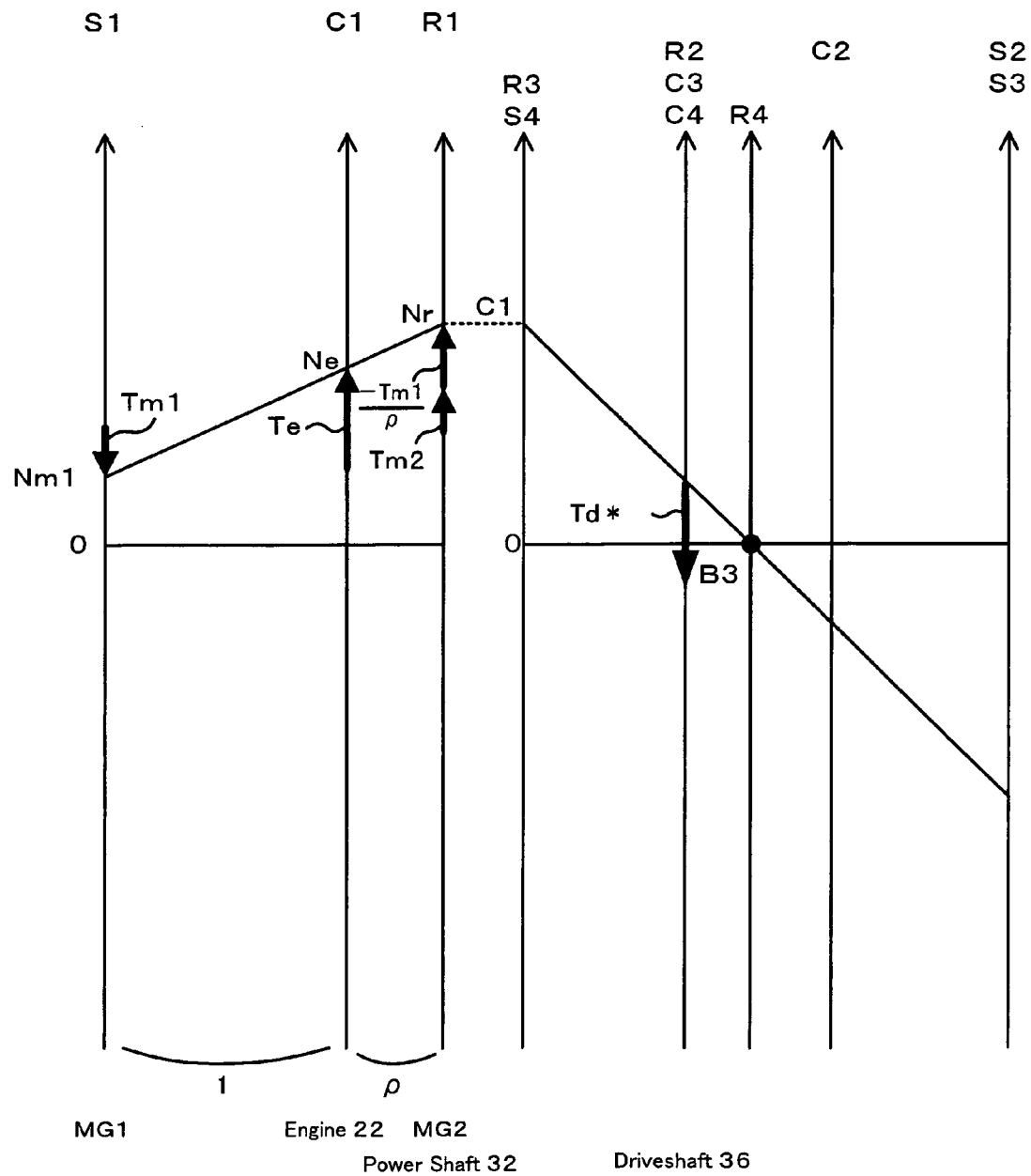
FIG. 6 is an alignment chart showing torque-rotation speed dynamics of respective rotational elements of a power distribution integration mechanism and the transmission included in the hybrid vehicle of the embodiment.

Equation (1) is a dynamic relational expression of the rotational elements included in the power distribution integration mechanism 30. FIG. 6 is an alignment chart showing torque-rotation speed dynamics of the respective rotational elements included in the power distribution integration mechanism 30 and the transmission 60. The left part is the alignment chart of the power distribution integration mechanism 30. An S1-axis represents the rotation speed of the sun gear 31 that is equivalent to the rotation speed Nm1 of the motor MG1. A C1-axis represents the rotation speed of the carrier 34 that is equivalent to the rotation speed Ne of the engine 22. An R1-axis represents the rotation speed Nr of the ring gear 32 that is equivalent to the rotation speed Nm2 of the motor MG2. The right part is the alignment chart of the transmission 60. An R3-R4 axis represents the rotation speed of the ring gear 64r of the planetary gear mechanism 64 and of the sun gear 66s of the planetary gear mechanism 66. An R2-C3-C4-axis represents the rotation speed of the ring gear 62r in the planetary gear mechanism 62, of the carrier 64c in the planetary gear mechanism 64, and of the carrier 66c in the planetary gear mechanism 66, which is equivalent to the rotation speed No of the driveshaft 36. An R4-axis represents the rotation speed of the ring gear 66r in the planetary gear mechanism 66. A C2-axis represents the rotation speed of the carrier 62c in the planetary gear mechanism 62. An S2-S3 axis represents the rotation speed of the sun gear 62s in the planetary gear mechanism 62 and of the sun gear 64s in the planetary gear mechanism 64. The broken line indicates the rotational elements connected by the clutch C1 (the R3-S4-axis with the R1-axis). Equation (1) is readily introduced from the alignment chart of FIG. 6. Two upward thick arrows on the R1-axis in FIG. 6 respectively show a torque output as a torque Tm1 from the motor MG1 and applied to the ring gear shaft 32a and a torque Tm2 output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as minimum and maximum torques that may be output from the motor MG2, according to Equations (3) and (4) given below (step S160):

$$T\min = (W\text{in} - Tm1^* \cdot Nm1)/Nm2 \tag{3}$$

$$T\max = (W\text{out} - Tm1^* \cdot Nm1)/Nm2 \tag{4}$$

The lower torque restriction Tmin is given by dividing a difference between the input limit Win of the battery 50 and power consumption (power generation) of the motor MG1, which is the product of the torque command Tm1* and the input current rotation speed Nm1 of the motor MG1, by the input current rotation speed Nm2 of the motor MG2. The upper torque restriction Tmax is given by dividing a difference between the output limit Wout of the battery 50 and the power consumption (power generation) of the motor MG1 by the input current rotation speed Nm2 of the motor MG2. The CPU 72 then calculates a tentative motor torque Tm2tmp to be output from the motor MG2 from the torque demand Td*, the torque command Tm1* of the motor MG1, and the gear ratio ρ of the power distribution integration mechanism 30 according to Equation (5) given below (step S170):

$$Tm2tmp=Td^*/\gamma+Tm1^*/\rho \qquad (5)$$

The CPU 72 limits the tentative motor torque Tm2tmp to the range between the calculated lower torque restriction Tmin and upper torque restriction Tmax to set a torque command Tm2* of the motor MG2 (step S180). Setting the torque command Tm2* of the motor MG2 in this manner restricts the torque (=Td*/γ) output to the ring gear shaft 32a within the range of the input limit Win and the output limit Wout of the battery 50. Equation (5) is readily introduced from the alignment chart of FIG. 6.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S190) and terminates the drive control routine. The engine ECU 24 receives the settings of the target rotation speed Ne* and the target torque Te* and performs fuel injection control and ignition control of the engine 22 to drive the engine 22 at a specified drive point of the target rotation speed Ne* and the target torque Te*. The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*. This control enables the efficient operation of the engine 22 and ensures output of a torque equivalent to the torque demand required for the vehicle to the driveshaft 36. Since there is no change speed request of the transmission 60 in this flow, gear of the transmission 60 is kept at the current speed 'n'.

When there is a change speed request (step S140: yes), on the other hand, the CPU 72 compares the target speed n* and the current speed 'n' and identifies whether the change speed request is an upshift request (step S200). Upon identification of an upshift request (step S200: yes), a maximum charging electric power Pmax to charge the battery 50 during change speed-time drive control (described later) is compared with the input limit Win of the battery 50 (step S210). A variation in maximum charging electric power Pmax output from the motors MG1 and MG2 to charge the battery 50 in the course of an upshift of the speed in the transmission 60 is experimentally or otherwise set according to the drive point of the engine 22 defined by the target rotation speed Ne* and the target torque Te* and is stored as a map in the ROM 74. The maximum charging electric power Pmax is read from the map and is set corresponding to the given drive point of the engine 22.

When the change speed request is not an upshift request but is a downshift request (step S200: no) or when the maximum charging electric power Pmax does not exceed the input limit Win of the battery 50 in the case of an upshift request (step S210: no), the CPU 72 sets the torque demand Td* set at step S110 to a change speed-time torque demand Ts and sets the target rotation speed Ne* and the target torque Te* set at step S120 respectively to a change speed-time rotation speed Nes and a change speed-time torque Tes of the engine 22 (step S220). The CPU 72 subsequently performs speed changeover control and change speed-time drive control (described below) (step S310) and exits from this drive control routine. The speed changeover control activates and controls the actuator 100 to change over the engagement and release of the clutches C1 and C2 and the brakes B1, B2, and B3 of the transmission 60 and thereby shift the gear of the transmission 60 to the target speed n*.

Figure 7:
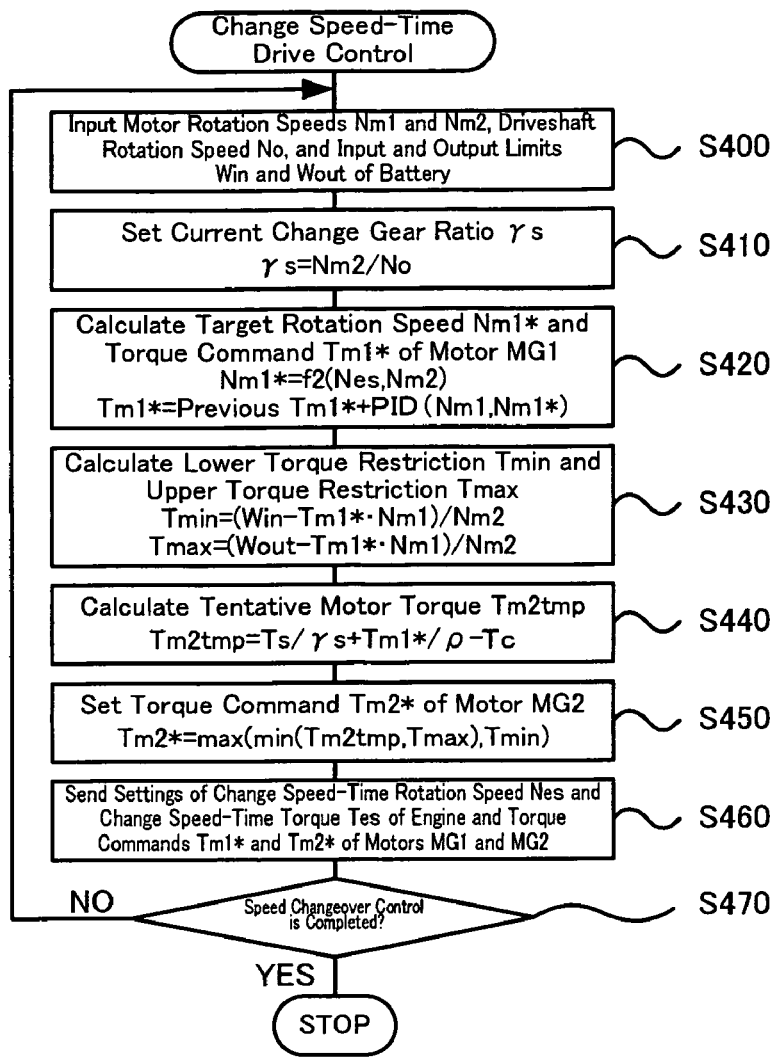
FIG. 7 is a flowchart showing the details of change speed-time drive control executed at step S310 in the drive control routine of FIG. 3.

The following gives the details of the change speed-time drive control. FIG. 7 is a flowchart showing the details of the change speed-time drive control executed by the hybrid electronic control unit 70 in the course of the speed changeover control. In the change speed-time drive control routine, the CPU 72 of the hybrid electronic control unit 70 first inputs various data required for control, that is, the rotation speeds Nm1 and Nm2 of the motors MG1 and MG2, the input limit Win and the output limit Wout of the battery 50, and the rotation speed No of the driveshaft 36 from the rotation speed sensor 37 (step S400). Division of the rotation speed Nm2 of the motor MG2 by the rotation speed No of the driveshaft 36 is set to a current change gear ratio γs of the transmission 60 (step S410).

After setting the current change gear ratio γs, the CPU 72 calculates the target rotation speed Nm1* of the motor MG1 from the change speed-time rotation speed Nes, the rotation speed Nr (=Nm2) of the ring gear shaft 32a, and the gear ratio ρ of the power distribution integration mechanism 30, while calculating the torque command Tm1* of the motor MG1 from the calculated target rotation speed Nm1* and the current rotation speed Nm1 of the motor MG1 according to Equation (2) given above (step S420). The calculation of the target rotation speed Nm1* substitutes the change speed-time rotation speed Nes for the target rotation speed Ne* in Equation (1) given above. The CPU 72 subsequently calculates the lower torque restriction Tmin and the upper torque restriction Tmax as the minimum and maximum torques that may be output from the motor MG2 from the input limit Win and the output limit Wout of the battery 50, the calculated torque command Tm1* of the motor MG1, the current rotation speed Nm1 of the motor MG1, and the current rotation speed Nm2 of the motor MG2 according to Equations (3) and (4) given above (step S430).

The CPU 72 then calculates the tentative motor torque Tm2tmp to be output from the motor MG2 from the change speed-time torque demand Ts, the calculated torque command Tm1* of the motor MG1, the gear ratio ρ of the power distribution integration mechanism 30, and a corrective torque Tc according to Equation (6) given below (step S440):

$$Tm2tmp=Tes/\gamma s+Tm1^*/\rho-Tc \qquad (6)$$

The corrective torque Tc is set to cancel out an inertia torque applied to the ring gear shaft 32a with a variation in rotation speed of a rotation system including the rotor of the motor MG2 induced by a change of the change gear ratio of the transmission 60. The CPU 72 limits the tentative motor torque Tm2tmp to the range between the calculated lower torque restriction Tmin and upper torque restriction Tmax to set the torque command Tm2* of the motor MG2 (step S450) This sets the torque command Tm2* of the motor MG2 as the torque restricted in the range of the input limit Win and the output limit Wout of the battery 50. The corrective torque Tc is computed according to the inertia moment of the rotation system including the rotor of the motor MG2 and the variation in rotation speed Nm2 of the motor MG2. The inertia torque is applied to the ring gear shaft 32a in a direction reverse to the direction of the variation in rotation speed Nm2 of the motor MG2. In the alignment chart of FIG. 6, the inertia torque is a torque shown by an upward arrow on the R-axis, whereas the corrective torque Tc is a torque shown by a downward arrow on the R-axis.

After setting the torque commands Tm1* and Tm2* of the motors MG1 and MG2, the CPU 72 sends the change speed-time rotation speed Nes and the change speed-time torque Tes of the engine 22 to the engine ECU 24 and the torque commands Tm1* and Tm2* of the motors MG1 and MG2 to the motor ECU 40 (step S460). The engine ECU 24 receives the settings of the change speed-time rotation speed Nes and the change speed-time torque Tes and performs fuel injection control and ignition control of the engine 22 to drive the engine 22 at a specified drive point of the change speed-time rotation speed Nes and the change speed-time torque Tes.

Until completion of the speed changeover control in the transmission 60 (step S470), the processing of steps S400 to S460 is repeated. On completion of the speed changeover control in the transmission 60 (step S470: yes), the CPU 72 terminates the change speed-time drive control routine of FIG. 7. During the speed changeover control in the transmission 60, the operations of the engine 22 and the motors MG1 and MG2 are controlled to ensure output of the power demand Pe*, while the engine 22 is kept at the specific drive point defined by the change speed-time rotation speed Nes and the change speed-time torque Tes set in the drive control routine of FIG. 3. As described above, when the change speed request is not an upshift request but a downshift request, the target rotation speed Ne* and the target torque Te* based on the efficient operation curve of the engine 22 and the curve of the power demand Pe* are set to the change speed-time rotation speed Nes and the change speed-time torque Tes at step S220 in the drive control routine of FIG. 3. Such control enables the gear change of the transmission 60 while driving the engine 22 at the efficient drive point, thus improving the fuel consumption. The driver may feel uncomfortable in the event of a variation in rotation speed of the engine 22 during the gear change of the transmission 60. This drive control keeps the engine 22 at the specific drive point during the gear change of the transmission 60 and thus effectively restrains the driver from feeling uncomfortable by the variation in rotation speed of the engine 22.

Referring back to the drive control routine shown in the flowchart of FIG. 3, when the change speed request is an upshift request (step S200: yes) and when the maximum charging electric power Pmax exceeds the input limit Win of the battery 50 (step S210: yes), it is probable that the gear change of the transmission 60 with the engine 22 kept at the specific drive point set at step S120 causes the battery 50 to be overcharged with excess electric power and deteriorates the battery 50. The CPU 72 accordingly sets a pre-upshift target rotation speed Nmtag, which is specified in advance to be a rotation speed of higher than '0', to the target rotation speed Nm1* of the motor MG1, while calculating the torque command Tm1* of the motor MG1 from the set target rotation speed Nm1* and the current rotation speed Nm1 of the motor MG1 according to Equation (2) given above (step S230). The pre-upshift target rotation speed Nmtag is set to the target rotation speed Nm1* of the motor MG1, in order to prevent the motor MG1 from having the rotation speed of below 0 and functioning as the generator during the speed changeover control.

The CPU 72 subsequently changes the setting of the target rotation speed Ne* of the engine 22 by calculation from the set target rotation speed Nm1* of the motor MG1, the rotation speed Nr (=Nm2) of the ring gear shaft 32a, and the gear ratio ρ of the power distribution integration mechanism 30 according to Equation (7) given below, while changing the setting of the target torque Te* of the engine 22 to the result of division of the power demand Pe* by the changed target rotation speed Ne* (step S240):

$$Ne^* = Nm1^* \cdot \rho/(1+\rho) - Nm2/(1+\rho) \quad (7)$$

This changes the target rotation speed Ne* of the engine 22 to a rotation speed corresponding to the operation of the motor MG1 at the pre-upshift target rotation speed Nmtag. The drive point of the engine 22 is accordingly shifted to ensure output of the power demand Pe* from the engine 22 driven at the changed rotation speed.

After changing the settings of the target rotation speed Ne* and the target torque Te* of the engine 22, the CPU 72 calculates the lower torque restriction Tmin and the upper torque restriction Tmax as the minimum and maximum torques that may be output from the motor MG2 and the tentative motor torque Tm2tmp to be output from the motor MG2 (steps S250 and 260) in the same manner as the processing of steps S160 and S170 in the drive control routine of FIG. 3 described previously. The CPU 72 limits the tentative motor torque Tm2tmp to the range between the calculated lower torque restriction Tmin and upper torque restriction Tmax to set the torque command Tm2* of the motor MG2 (step S270). The CPU 72 sends the target rotation speed Ne* and the target torque Te* of the engine 22 to the engine ECU 24 and the torque commands Tm1* and Tm2* of the motors MG1 and MG2 to the motor ECU 40 (step S280). The processing of steps S100 to S140, steps S200 and S210, and steps S230 to S280 is repeated until the rotation speed Nm1 of the motor MG1 reaches or exceeds the pre-upshift target rotation speed Nmtag (step S290). When the rotation speed Nm1 of the motor MG1 reaches or exceeds the pre-upshift target rotation speed Nmtag (step S290: yes), the CPU 72 sets the torque demand Td* set at step S110 to the change speed-time torque demand Ts and sets the target rotation speed Ne* and the target torque Te* of the engine 22 changed at step S240 respectively to the change speed-time rotation speed Nes and the change speed-time torque Tes of the engine 22 at the time of the gear change of the transmission 60 (step S300). The CPU 72 subsequently performs the speed changeover control of the transmission 60 and the change speed-time drive control (step S310) and exits from this drive control routine. When the change speed request is an upshift request, the speed changeover control and the change speed-time drive control are performed after the change of the rotation speed Nm1 of the motor MG1 to or over the pre-upshift target rotation speed Nmtag in the above manner.

Figure 8:
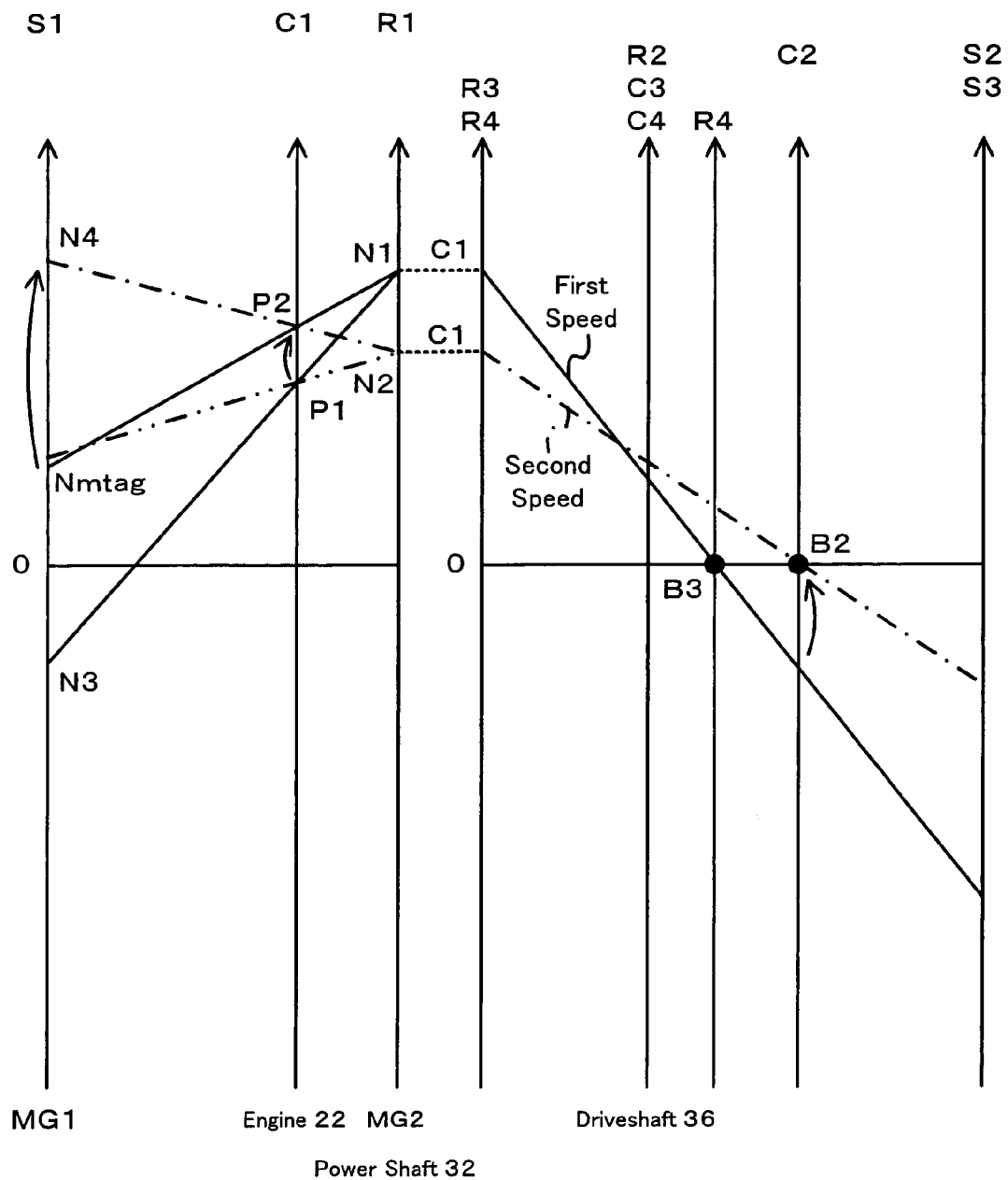
FIG. 8 is an alignment chart showing a relation of the rotation speeds of the respective rotational elements in the power distribution integration mechanism and the transmission.

The following description regards a series of operations at the time of an upshift from the first speed to the second speed in the transmission 60. FIG. 8 is an alignment chart showing a relation of the rotation speeds of the respective rotational elements in the power distribution integration mechanism 30 and the transmission 60 at the time of an upshift from the first speed to the second speed in the transmission 60. The solid line plots show the relation of the rotation speeds of the respective rotational elements in the embodiment at the setting of the gear to the first speed in the transmission 60 immediately before an upshift from the first speed (the engagement of the clutch C1 and the brake B3 in combination with the release of the brake B2) to the second speed (the engagement of the clutch C1 and the brake B2 in combination with the release of the brake B3). The one-dot chain line plots show the relation of the rotation speeds of the respective rotational elements in the embodiment immediately after the upshift from the first speed to the second speed in the transmission 60. For the purpose of comparison, the two-dot chain line plots show the relation of the rotation speeds of the respective rotational elements immediately after the upshift from the first speed to the second speed without changing the drive point of the engine 22 prior to the upshift of the transmission 60. In the alignment chart of FIG. 8, the domain over the value '0' shows the positive rotation speed, whereas the domain below the value '0' shows the negative rotation speed. Immediately before the upshift from the first speed to the second speed in the transmission 60, the motor MG2 is driven at a relatively high rotation speed N1 by means of the transmission 60 as shown by the solid line plot. When the engine 22 is driven at an efficient drive point P1, the motor MG1 is driven to rotate at a negative rotation speed N3. In this state, the motor MG2 functions as the generator, and the motor MG1 functions as the motor. There may thus be circulation of mechanical power—electric power—mechanical power (power circulation) with regard to part of energy. In the case of an upshift of the gear from the first speed to the second speed in the transmission 60 with the operation of the engine 22 kept at the efficient drive point P1 under the power circulation, the hydraulic pressure in the transmission 60 lowers the rotation speed of the motor MG2 from the relatively high rotation speed N1 to a lower rotation speed N2 as shown by the two-dot chain line plot. In order to keep the operation of the engine 22 at the efficient drive point P1, the motor MG1 then outputs a positive torque (upward torque in the alignment chart) and changes the rotation speed of the motor MG1 from the negative rotation speed N3 to a positive rotation speed N4. The motor MG1 initially functions as the generator during the change of the rotation speed from the negative rotation speed N3 to 0, and subsequently functions as the motor during the further change of the rotation speed from 0 to the positive rotation speed N4. The motor MG2 outputs a negative torque (downward torque in the alignment chart) to give a reactive force against the output torque of the motor MG1 and ensure output of a torque equivalent to the change speed-time torque demand Tes. The motor MG2 accordingly functions as the generator during the upshift of the transmission 60. Namely both the motors MG1 and MG2 function as the generator during the change of the rotation speed of the motor MG1 from the negative rotation speed N3 to 0. It is thus highly probable that the charging electric power to charge the battery 50 exceeds the input limit Win of the battery 50. The control procedure of the embodiment changes the drive point of the engine 22 from the point P1 to a point P2 to increase the rotation speed of the motor MG1 to or over the positive, pre-upshift target rotation speed Nmtag prior to the upshift and then allows the actual upshift from the first speed to the second speed in the transmission 60 as shown by the solid line plots. Such control desirably prevents the motor MG1 from being driven at the negative rotation speed and functioning as the generator in the course of the upshift gear change and thereby restrains the battery 50 from being overcharged with excess electric power.

As described above, the hybrid vehicle 20 of the embodiment actually shifts up the gear of the transmission 60 after changing the drive point of the engine 22 to increase the rotation speed of the motor MG1 to a positive level. Such control effectively prevents the battery 50 from being overcharged with excess electric power during the upshift gear change. The control procedure of the embodiment changes the drive point of the engine 22 with keeping the power level output from the engine 22. This enables the upshift of the gear in the transmission 60 while ensuring output of the power equivalent to the torque demand required for driving from the engine 22. The engine 22 is driven at the efficient drive point based on the efficient operation curve of the engine 22 and the curve of the power demand Pe*, when the gear of the transmission 60 is not shifted up or when the charging electric power to charge the battery 50 does not exceed the input limit Win of the battery 50 during the upshift of the gear in the transmission 60. This arrangement desirably avoids unnecessary decrease of the fuel consumption.

The hybrid vehicle 20 of the embodiment sets the drive point of the engine 22 in response to an upshift request, in order to ensure the output of the power demand Pe* from the engine 22. The setting of the drive point of the engine 22 is required to increase the rotation speed Nm1 of the motor MG1, which depends upon the target rotation speed Ne* of the engine 22 and the rotation speed Nm2 of the motor MG2, to the pre-upshift target rotation speed Nmtag. As long as this requirement is satisfied, the drive point of the engine 22 may be set to increase the rotation speed of the engine 22 without ensuring the output of the power demand Pe* from the engine 22.

In the hybrid vehicle 20 of the embodiment, in the case of an upshift request, the pre-upshift target rotation speed Nmtag is set to a positive rotation speed to make the motor MG1 function as the motor during the speed changeover control. As long as the sum of the charging electric power from the motor MG1 and the charging electric power from the motor MG2 does not exceed the input limit Win of the battery 50, the pre-upshift target rotation speed Nmtag may be set to a negative rotation speed that keeps the charging electric power from the motor MG1 to or below a predetermined power level. The predetermined power level may be based on the charging electric power output from the motor MG2 during the gear change and the input limit Win of the battery 50. The motor MG1 has a large power loss in a region of low rotation speed and high torque. The pre-upshift target rotation speed Nmtag may thus be set to a relatively small negative rotation speed that causes the motor MG1 to output only a low level of charging electric power due to its large power loss.

In the hybrid vehicle 20 of the embodiment, at the time of an upshift request, when the maximum charging electric power Pmax for charging the battery 50 does not exceed the input limit Win of the battery 50 during the change speed-time drive control, the control procedure executes the processing of step S220 to set the target rotation speed Ne* and the target torque Te* set at step S120 respectively to the change speed-time rotation speed Nes and the change speed-time torque Tes. Under such conditions, the processing of and after step S230 may alternatively be executed to change the target rotation speed Ne* and the target torque Te* set at step S120.

The hybrid vehicle 20 of the embodiment reads the maximum charging electric power Pmax for charging the battery 50 from the map corresponding to the given drive point of the engine 22. The maximum charging electric power Pmax may be fixed to a specific value, which is determined in advance experimentally or otherwise, irrespective of the drive point of the engine 22.

In the hybrid vehicle 20 of the embodiment, the drive point of the engine 22 is set at step S120 based on the efficient operation curve of the engine 22 and the curve of the power demand Pe*. The drive point of the engine 22 may be set based on another operation curve different from the efficient operation curve of the engine 22 or may be set based on only the curve of the power demand Pe* irrespective of the operation curve.

In the hybrid vehicle 20 of the embodiment, the process of setting the tentative motor torque Tm2tmp to be output from the motor MG2 at step S440 takes into account the corrective torque Tc for canceling out the inertia torque applied to the ring gear shaft 32a with a variation in rotation speed of the rotation system including the rotor of the motor MG2. The consideration of the corrective torque Tc is, however, not essential but may be omitted.

Figure 9:
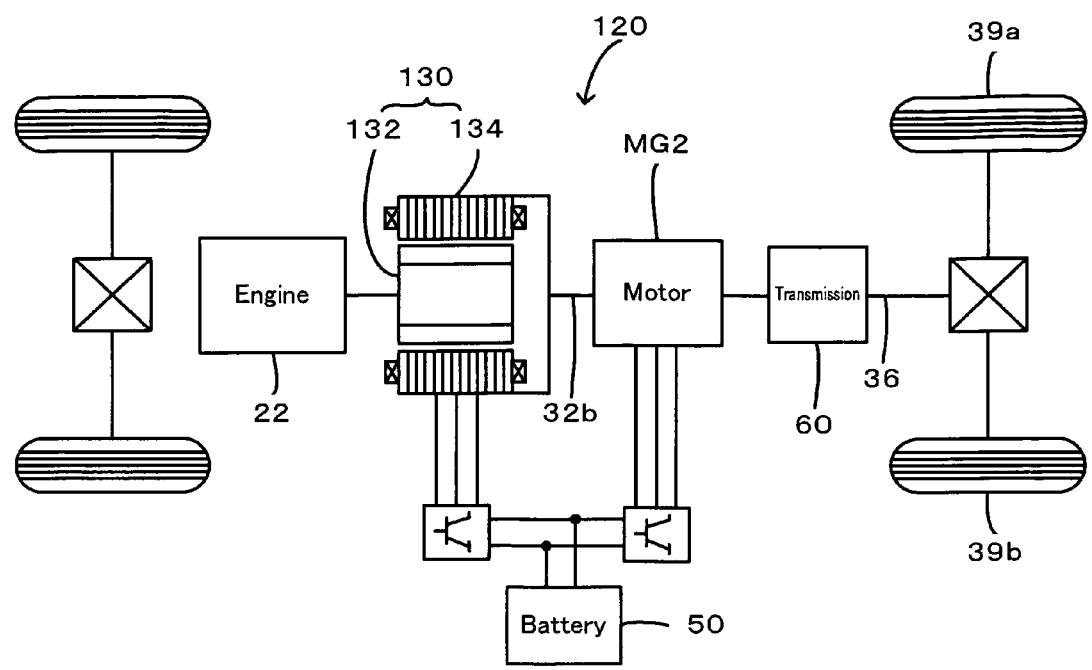
FIG. 9 schematically illustrates the configuration of another hybrid vehicle in one modified example.

In the hybrid vehicle 20 of the embodiment, the power of the engine 22 is output via the power distribution integration mechanism 30 to the ring gear shaft 32a or the power shaft that is connected via the transmission 60 to the driveshaft 36 linked to the drive wheels 39a and 39b. In one modified structure shown in FIG. 9, the hybrid vehicle 120 may be equipped with a pair-rotor motor 130, which includes an inner rotor 132 connected to a crankshaft of an engine 22 and an outer rotor 134 connected to a power shaft 32b that is linked via a transmission 60 to a driveshaft 36 for outputting power to drive wheels 39a and 39b. The pair-rotor motor 130 transmits part of the output power of the engine 22 to the drive wheels 39a and 39b via the power shaft 32b, the transmission 60, and the driveshaft 36, while converting the residual engine output power into electric power.

The embodiment regards application of the invention to the hybrid vehicle. This application is, however, only illustrative and not restrictive in any sense. The technique of the invention may be actualized by diversity of other applications, for example, various vehicles including automobiles and other vehicles as well as control methods of such various vehicles.

The primary elements in the embodiment and its modified examples are mapped to the primary constituents in the claims of the invention as described below. The engine 22 in the structure of the embodiment corresponds to the 'internal combustion engine' of the invention. The motor MG1 and the power distribution integration mechanism 30 that is linked to the crankshaft 26 of the engine 22, is connected to the ring gear shaft 32a to enable rotation of the ring gear shaft 32a independently of the crankshaft 26, and regulates the rotation speed of the crankshaft 26 relative to the ring gear shaft 32a through input and output of electric powers and input and output of driving forces to and from the crankshaft 26 and the ring gear shaft 32a in the structure of the embodiment are equivalent to the 'rotation regulator' of the invention. The motor MG2 that inputs and outputs power from and to the ring gear shaft 32a in the structure of the embodiment corresponds to the 'motor' of the invention. The transmission 60 that is connected to the ring gear shaft 32a and to the driveshaft 36 for transmission of power between the ring gear shaft 32a and the driveshaft 36 with a change of the speed in the structure of the embodiment is equivalent to the 'change speed transmission' of the invention. The battery 50 that transmits electric power to and from the motors MG1 and MG2 in the structure of the embodiment corresponds to the 'accumulator' of the invention. The hybrid electronic control unit 70 that executes the processing of steps S110 and S120 in the structure of the embodiment is equivalent to the 'drive point setting module' of the invention. The processing of step S110 sets the torque demand Td* and the power demand Pe*, and the processing of step S120 sets the target rotation speed Ne* and the target torque Te* of the engine 22 corresponding to the power demand Pe*. The hybrid electronic control unit 70 that executes the processing of step S130 in the structure of the embodiment is equivalent to the 'target speed setting module' of the invention. The processing of step S130 sets the target speed n* corresponding to the torque demand Td* and the vehicle speed V. The hybrid electronic control unit 70 that executes the processing of steps S220, S230, S240, S270, S280, S300, and S310, the engine ECU 24 that controls the operation of the engine 22 to be driven at a specific drive point defined by the combination of the target rotation speed Ne* and the target torque Te* or by the combination of the change speed-time rotation speed Nes and the change speed-time torque Tes, and the motor ECU 40 that controls the operations of the motors MG1 and MG2 to be driven with the respective torque commands Tm1* and Tm2* in the structure of the embodiment are equivalent to the 'control module' of the invention. The processing of step S220 sets the target rotation speed Ne* and the target torque Te* respectively to the change speed-time rotation speed Nes and the change speed-time torque Tes, in the absence of an upshift request of the gear in the transmission 60. The processing of step S230 sets the pre-upshift target rotation speed Nmtag to the target rotation speed Nm1* of the motor MG1 and calculates the torque command Tm1* of the motor MG1 from the set target rotation speed Nm1* and the current rotation speed Nm1 of the motor MG1, in the presence of an upshift request. The processing of step S240 changes the target rotation speed Ne* of the engine 22 to make the rotation speed Nm1 of the motor MG1 approach to the target rotation speed Nm1* set at step S230 and changes the target torque Te* of the engine 22 to the result of division of the power demand Pe* by the changed target rotation speed Ne*. The processing of step S270 sets the torque command Tm2* of the motor MG2. The processing of step S280 sends the target rotation speed Ne* and the target torque Te* of the engine 22 to the engine ECU 24 and the torque commands Tm1* and Tm2* of the motors MG1 and MG2 to the motor. ECU 40. The processing of step S300 sets the changed target rotation speed Ne* and the changed target torque Te* after the change of the drive point of the engine 22 to the change speed-time rotation speed Nes and the change speed-time torque Tes. The processing of step S310 executes the speed changeover control and the change speed-time drive control to change the gear of the transmission 60 to the target speed n* with the operation of the engine 22 kept at the drive point of the change speed-time rotation speed Nes and the change speed-time torque Tes. This mapping of the primary elements in the embodiment and its modified examples to the primary constituents in the claims of the invention are not restrictive in any sense but are only illustrative for concretely describing some modes of carrying out the invention. Namely the embodiment and its modified examples discussed above are to be considered in all aspects as illustrative and not restrictive. The scope and spirit of the present invention are indicated by the appended claims, rather than by the foregoing description.

The embodiment and its modified examples discussed above are to be considered in all aspects as illustrative and not restrictive. There may be many other modifications, changes, and alterations without departing from the scope or spirit of the main characteristics of the present invention.

The disclosure of Japanese Patent Application No. 2006-279885 filed Oct. 13, 2006 including specification, drawings and claims is incorporated herein by reference in its entirety.

What is claimed is:

1. A vehicle, comprising:
   an internal combustion engine;
   a rotation regulator that is linked to an output shaft of the internal combustion engine, is connected to a power shaft different from the output shaft to enable rotation of the power shaft independently of the output shaft, and regulates a rotation speed of the output shaft relative to the power shaft through input and output of electric powers and input and output of driving forces to and from the output shaft and the power shaft;

a motor that inputs and outputs power to and from the power shaft;

a change speed transmission that is linked to the power shaft and to a driveshaft connected with an axle and enables transmission of power between the power shaft and the driveshaft with a change of a gear;

an accumulator that transmits electric power to and from the rotation regulator and the motor;

a target drive point setting module that sets a target drive point of the internal combustion engine corresponding to a driving force demand required for driving the vehicle;

a target speed setting module that sets a target speed as the gear of the change speed transmission corresponding to the driving force demand and a vehicle speed; and a control module that, in the case of no upshift of the gear of the change speed transmission, controls the internal combustion engine, the rotation regulator, the motor, and the change speed transmission to keep operation of the internal combustion engine at the set target drive point and to drive the vehicle with output of a driving force equivalent to the driving force demand at the target speed set to the gear of the change speed transmission, in the case of an upshift of the gear of the change speed transmission, the control module controlling the internal combustion engine, the rotation regulator, the motor, and the change speed transmission to change a drive point of the internal combustion engine until the rotation regulator falls into a specific operation state to output charging electric power of not higher than a predetermined electric power level in the course of changing the gear of the change speed transmission to the target speed while keeping a current setting of the gear of the change speed transmission and the drive of the vehicle with the output of the driving force equivalent to the driving force demand, after the change of the drive point of the internal combustion engine, the control module controlling the internal combustion engine, the rotation regulator, the motor, and the change speed transmission to actually change the gear of the change speed transmission to the target speed while keeping the operation of the internal combustion engine at the changed drive point.

2. The vehicle in accordance with claim 1, wherein the control module changes the drive point of the internal combustion engine to increase a rotation speed of the internal combustion engine, in the case of the upshift of the gear of the change speed transmission.

3. The vehicle in accordance with claim 1, wherein the control module changes the drive point of the internal combustion engine to keep an output power level of the internal combustion engine, in the case of the upshift of the gear of the change speed transmission.

4. The vehicle in accordance with claim 1, wherein in the case of the upshift of the gear of the change speed transmission, when charging electric power for charging the accumulator does not exceed an input limit of the accumulator as a maximum chargeable electric power in the course of changing the gear of the change speed transmission to the set target speed with the operation of the internal combustion engine kept at the set target drive point, the control module controls the internal combustion engine, the rotation regulator, the motor, and the change speed transmission to actually change the gear of the change speed transmission to the set target speed without changing the drive point of the internal combustion engine but with keeping the operation of the internal combustion engine at the set target drive point.

5. The vehicle in accordance with claim 1, wherein the target drive point setting module sets the target drive point of the internal combustion engine, based on the driving force demand and an efficient operation restriction for ensuring efficient operation of the internal combustion engine.

6. The vehicle in accordance with claim 1, wherein the rotation regulator has:

a three shaft-type power input output mechanism that is connected to three shafts, the output shaft of the internal combustion engine, the power shaft, and a third shaft and determines input and output of power to and from a remaining shaft based on input and output of powers to and from any two shafts among the three shafts; and a generator that inputs and outputs power to and from the third shaft.

* * * * *

UNITED STATES PATENT AND TRADEMARK OFFICE
CERTIFICATE OF CORRECTION

| | | |
|---|---|---|
| PATENT NO. | : 7,575,078 B2 | Page 1 of 1 |
| APPLICATION NO. | : 11/907094 | |
| DATED | : August 18, 2009 | |
| INVENTOR(S) | : Koichiro Muta et al. | |

It is certified that error appears in the above-identified patent and that said Letters Patent is hereby corrected as shown below:

Title page, add the following item:

(30)   Foreign Application Priority Data

October 13, 2006 (JP)..........2006-279885

Signed and Sealed this

Sixth Day of October, 2009

David J. Kappos
*Director of the United States Patent and Trademark Office*